Feb. 13, 1934.　　　J. A. SHAFER　　　1,946,714
CAR DOOR LOCKING AND OPERATING MEANS
Filed Jan. 14, 1929
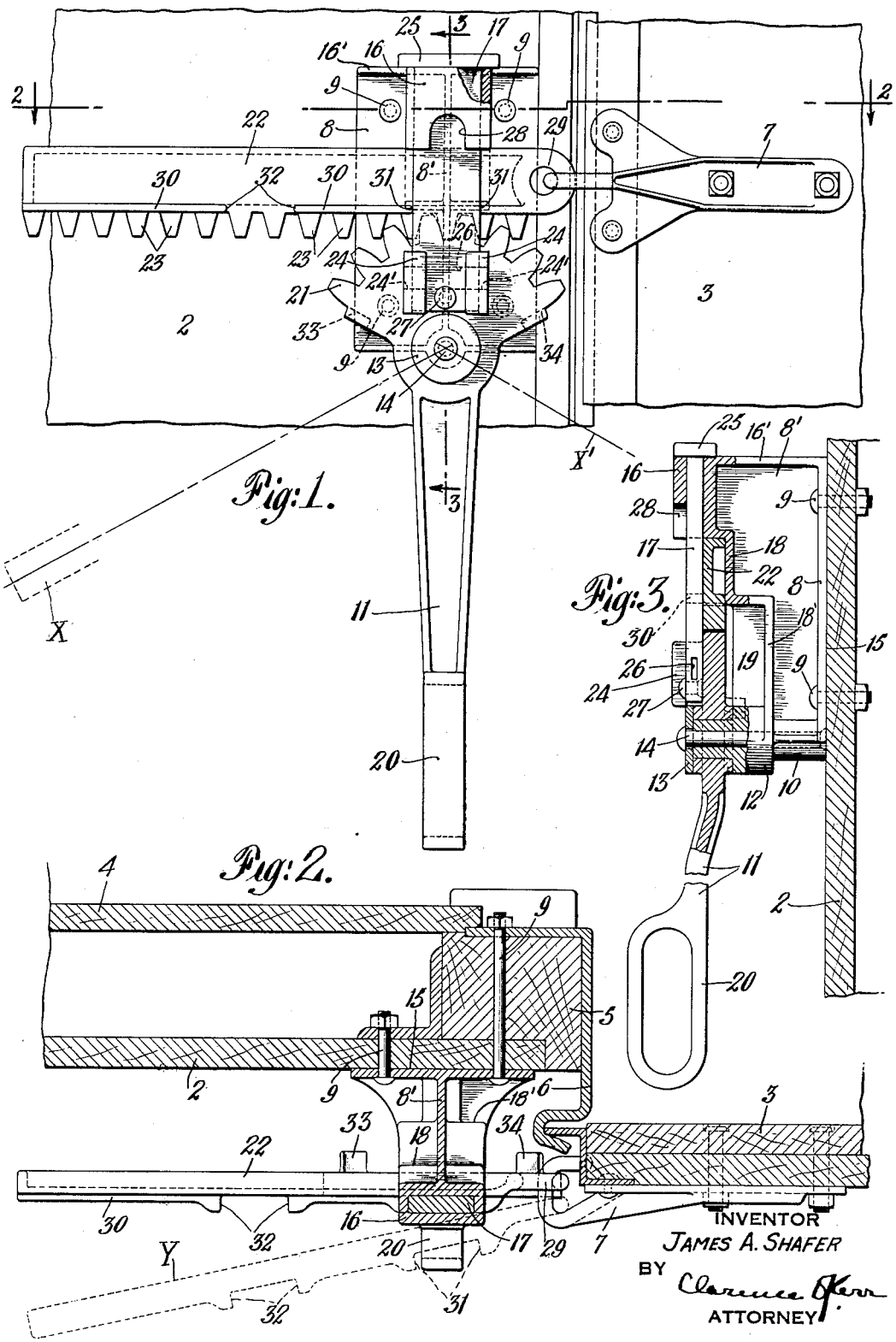
INVENTOR
JAMES A. SHAFER
BY
ATTORNEY Patented Feb. 13, 1934

1,946,714

UNITED STATES PATENT OFFICE 1,946,714

CAR DOOR LOCKING AND OPERATING MEANS

James A. Shafer, East Cleveland, Ohio, assignor to National Malleable and Steel Castings Company, Cleveland, Ohio, a corporation of Ohio Application January 14, 1929. Serial No. 332,337

10 Claims. (Cl. 268—44)

This invention relates to mechanisms for locking and operating the doors of freight cars and the like. One of the objects of the invention is the provision of means compact in construction and involving relatively few parts whereby car doors may be effectively locked and through which the opening and closing of such doors may be facilitated. Another object is to provide a car door operating means capable of shifting the door a substantially greater extent than that obtainable with the operating mechanisms employed heretofore. The previously known car door operating devices provide for only a slight movement of the door so that if the latter should stick or otherwise effectively resist being drawn to completely open position, a pinch bar or prying element is required. Through my invention, the door may be readily moved a sufficient distance by the door operating mechanism to permit a man to stand in the doorway in position to properly use his strength to move the door to its completely open position. Another object of my invention is the embodiment of a combined door operating and locking means in a unitary structure which shall project a minimum distance from the side of the car and which is readily applicable to existing cars. Other features of the invention will be hereinafter described and claimed.

In the accompanying drawing:

Fig. 1 is a view in side elevation showing a portion of the side of a freight car and freight car door, provided with door operating and locking mechanism embodying my invention; the housing for the locking pin being shown partly in section and partly broken away.

Fig. 2 is a horizontal sectional view taken on line 2—2 of Fig. 1, and

Fig. 3 is a view partly in elevation and partly in vertical section on line 3—3 of Fig. 1.

Referring more specifically to the drawing, a portion of the siding of a freight car is shown at 2, and a part of the car door at 3. For purposes of illustration, my invention is shown applied to a freight car of standard double-sheathed construction; the numeral 4 indicating the car lining. The wooden front door post is designated 5 and the metal door post 6. At 7 there is shown a door hasp bracket of standard design.

As shown, my improved mechanism includes a base-plate 8 which is adapted to be secured by bolts 9 to the side of the car adjacent the front door post 5. Projecting outwardly from the lower end of plate 8 is a boss 10 on which is pivotally mounted a hand lever 11. The boss 10 is provided with a shouldered portion 12 abutting against one side of the lever 11, while a washer 13 may be placed on the other side of said lever, said washer and lever being held on the base-plate by a rivet 14 passing through the boss 10. Said rivet, as shown, may be driven with a flat head at its inner end, flush with the surface 15 of the base plate. The plate 8 is shown provided at its top with an outwardly extending portion 16' and with an extension 16 projecting downwardly therefrom, said extension 16 being apertured to receive the slidable locking bolt or pin 17. Extension 16 is provided with an offset portion 18 which in turn is joined to the boss 10 by the offset portion 18'. Between said portions 18, 18', and the shouldered portion 12 of boss 10 there is positioned a rib 19 which acts as a stop for limiting the extent of movement of operating lever 11, as will later appear. A reinforcing web 8' is shown extending the length of the plate 8.

The operating lever 11 is provided with a handle 20 at its lower end and a gear sector 21 at its upper end. The center of said sector is the pivot point of said lever 11. A door hasp 22 is provided on its lower edge with rack teeth 23 for engagement with the gear sector 21. Said hasp fits within the offset 18 of the base plate, and when said hasp is in position in said offset its rack teeth 23 engage the teeth of said gear sector. The bolt or pin 17, when in lowered or partly lowered position (i. e., with its lower end projecting below the top of offset 18), acts to hold said hasp within said offset.

The gear sector 21 is provided on its outer face with flanged guides 24 for receiving the lower end of the pin 17 when the latter is in its lowermost position. Pin 17 is upset to form a head 25, while at its lower end said pin is provided with a slot 26 for the usual sealing wire or strip, said slot registering with similar slots 24' in the guides 24. For preventing the removal of pin 17 from the plate 8, after said pin has been assembled with said plate, a rivet 27 may be driven in the lower end of said pin 17. As shown, the inner end of the rivet is driven flush with the inner surface of said pin. A notch 28 in extension 16 of plate 8 accommodates the projecting head of rivet 27 and allows pin or bolt 17 to be raised sufficiently to free the hasp 22.

Hasp 22 is secured to the bracket 7 by the engagement of its eye 29 therewith. Said hasp is also provided at its lower edge with an outwardly extending flange 30, the latter being cut away at 31 and 32 to accommodate the pin 17 whereby the door may be locked in fully closed or partly open position as desired. Flange 30 further serves to support the pin 17 in partly raised position during opening and closing movements of the door so that said pin will not interfere with the movements of the operating lever 11, while at the same time permitting said pin to overlie hasp 22 and thus maintain the teeth of said hasp in engagement with sector 21.

The operation of the above-described mechanism may be summarized as follows:

With the door in tightly closed, locked, and sealed position, as in the drawing, the first step in opening it consists in breaking and withdrawing the seal (not shown). The pin 17 is then raised until its lower edge just clears the flange 30 of hasp 22. This may be conveniently done with the left hand, and with the pin in the position stated the hand lever 11 is swung in a clockwise direction with the other hand. After the hasp, and with it the door, has been forced to the right far enough to bring the flange 30 underneath the lower end of the pin 17, said flange will support said pin so that the operator may now use both hands to operate the lever 11. Said lever is swung to the position indicated by the dotted lines of the end of the handle at X. In this position an inwardly projecting lug 33 on lever 11 engages rib 19 of the base plate and prevents further rotation of said lever. A corresponding lug 34 limits rotation of said lever in the opposite direction.

After the hand lever 11 has been moved to the dotted line position indicated at X, the pin 17 may be raised sufficiently to disengage the hasp 22, and the hasp swung forward as indicated by the dotted lines at Y (Fig. 2) to free it from the teeth on the sector 21. The door may now be opened the rest of the way by hand, but if the door still sticks or binds so as to make hand opening difficult or impossible, the following additional procedure may be adopted: Upon pulling forward the hasp to free it from the sector 21, the hand lever 11 is permitted to drop back to its original vertical position. The hasp is then returned to its position in engagement with sector 21, and the pin 17 allowed to drop on to the flange 30 to maintain the hasp in such position. Then the original operation is repeated, swinging the hand lever 11 clockwise. This may be continued until the end of the hasp is reached. The length of the hasp may be such as to provide for opening the door far enough to allow a man to stand in the opening with his back against the door post 6 where he will be in a position to properly use his strength to shove the door open. The door may be opened to any desired extent by the hand lever 11, depending upon the length of hasp employed.

Through my mechanism the door may be locked and sealed in partly opened or "ventilated" position which is desirable when transporting certain classes of goods. This, it will be seen, is accomplished through the provision of the second notch 32 in the door hasp flange 30, which notch is adapted to cooperate with the pin 17 and hand lever 11 in the same way as the notch 31.

The closing of the door may be effected by a reversal of the operation described for opening the door, the hand lever being simply swung in a counter-clockwise direction from its vertical position to the position indicated by the dot and dash line X'. When the door is tightly closed the hasp is swung forward, allowing the lever 11 to drop into its normal vertical position after which the hasp is replaced and the pin 17 dropped and sealed.

It will be seen that in addition to the advantages hereinbefore noted, the mechanism which I have provided permits the use of an exceptionally strong locking pin or bolt to prevent movement of the door, and that the door, in addition to being locked by the pin dropping through a slot in the hasp ledge, is held against movement by the interlocking of the teeth on the hasp and gear sector, the hand lever being held in vertical position by the locking pin. Also, it may be noted that I provide a hand lever, the operating handle 20 of which is spaced sufficiently from the side of the car to prevent barking of the operator's knuckles. My design, it will also be evident, is not only compact, but may be readily applied to existing cars without alteration; it being only necessary to insert the hasp 22 in the standard hasp bracket already on the car and bolt to the side of the car the assembled unit comprising plate 8, lever 11, and locking pin 17.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a car door operating and locking mechanism, a supporting member, an operating element mounted on said member, a hasp adapted to be mounted on said member for operation by said element, a locking pin mounted on said member, and means whereby said pin may engage both said operating element and said hasp.

2. In a car door operating and locking mechanism, a longitudinally movable hasp, a locking element for preventing longitudinal movement of said hasp and shiftable to a position permitting such movement, a member for shifting said hasp, said member having means on one side thereof for receiving said locking element, and means responsive to longitudinal movement of the hasp for maintaining said locking element in said shifted position.

3. In a car door operating and locking mechanism, a supporting member having an apertured extension, a locking pin mounted in said extension, a hasp positioned on said member and having a series of teeth, a toothed sector mounted on said member and engageable by the teeth on said hasp, manipulative means for operating said sector, means engageable by said pin for preventing operation of said hasp and other means engageable by said pin for preventing movement of said manipulative means.

4. A car door operating device comprising, in combination, an oscillatable gear sector, a member adapted to be connected to a door and having a rack portion engaged by said gear sector, with provisions whereby said member may be disengaged from said sector to permit return of the latter to normal position following operation of said member by said sector, and locking means engageable with said rack in a plurality of positions and said sector in one position.

5. In a device of the class described, a hasp movable both longitudinally and laterally, a locking element and means whereby in one position of the locking element said element prevents both longitudinal and lateral movement of said hasp, in another position said element permits longitudinal movement of said hasp but prevents lateral movement thereof, and in a third position said element permits both longitudinal and lateral movement of said hasp.

6. In a device of the class described, an operating member, a hasp normally in operative relation to said member for actuation thereby, a locking element, and means whereby in one position of the locking element said element prevents actuation of said hasp by said member, in a second position said element permits actuation of said hasp by said member but prevents movement of said hasp out of operative relation to said member, and in a third position said element permits movement of the hasp out of operative relation to said member.

7. In a device of the class described, an element adapted to be connected to a door; a member for operating said element to move said door; a locking pin, and means whereby in one position of the locking pin said pin prevents operation of said operating member, in a second position said pin permits operation of said member but prevents disengagement of said element from said member, and in a third position said pin permits disengagement of said element from said member.

8. In a car door operating and locking mechanism, a supporting member, a locking pin mounted on said member, a hasp positioned on said member and having a series of teeth, a toothed sector mounted on said member and engageable by the teeth on said hasp, manipulative means for operating said hasp through said sector, means whereby said pin prevents operation of said hasp, and other means whereby said pin prevents operation of said manipulative means.

9. In a car door operating and locking mechanism, a supporting member, an operating element mounted on said member, means on said member for receiving a hasp for operation by said element, means on said member for receiving an element for locking said hasp, and an element shiftable on said member into a position for directly locking said hasp and simultaneously engaging said operating element for preventing movement of the latter.

10. In a car door locking mechanism, a shiftable locking element, a hasp adapted to be connected to a car door, said hasp having a flange with a plurality of apertures for receiving said locking element whereby the door may be locked in either fully closed or partly open position, a member for operating said hasp, and means on said operating member for receiving said locking element.

JAMES A. SHAFER.